US 6,705,285 B2

(12) United States Patent
Yip et al.

(10) Patent No.: US 6,705,285 B2
(45) Date of Patent: Mar. 16, 2004

(54) AIR FLOW TARGET DETERMINATION

(75) Inventors: James W Yip, Bakersfield, CA (US);
Michael J Prucka, Grass Lake, MI (US);
Yi Cheng, Ypsilanti, MI (US);
Paul R Arlauskas, Walled Lake, MI (US);
Daniel B Diebel, Ypsilanti, MI (US);
Kerry D Franks, Chelsea, MI (US);
Gregory L Ohl, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 149 days.

(21) Appl. No.: 10/003,779

(22) Filed: Oct. 31, 2001

(65) Prior Publication Data

US 2003/0079719 A1 May 1, 2003

(51) Int. Cl.[7] ................ F02D 41/00; F02D 23/02
(52) U.S. Cl. ................ 123/350; 701/110
(58) Field of Search ................ 123/350, 325, 123/480; 701/110

(56) References Cited

U.S. PATENT DOCUMENTS

| 4,048,964 A | | 9/1977 | Kissel |
| 4,750,352 A | | 6/1988 | Kolhoff |
| 5,078,109 A | * | 1/1992 | Yoshida et al. ............. 123/350 |
| 5,174,119 A | | 12/1992 | Hanauer et al. |
| 5,228,292 A | | 7/1993 | Hanauer et al. |
| 5,261,236 A | | 11/1993 | Ironside et al. |
| 5,467,750 A | | 11/1995 | Braun et al. |
| 5,706,790 A | | 1/1998 | Kemmler et al. |
| 5,729,455 A | * | 3/1998 | Yamashita et al. .......... 303/139 |
| 5,780,981 A | | 7/1998 | Sonntag et al. |
| 5,906,183 A | | 5/1999 | Echtle et al. |
| 5,937,831 A | | 8/1999 | Volkmann et al. |
| 6,006,724 A | * | 12/1999 | Takahashi et al. ...... 123/339.19 |
| 6,020,652 A | | 2/2000 | Daudel et al. |
| 6,050,093 A | | 4/2000 | Daudel et al. |
| 6,055,811 A | | 5/2000 | Maddock et al. |
| 6,058,707 A | | 5/2000 | Bischoff |
| 6,065,446 A | * | 5/2000 | Engl et al. ................... 123/350 |
| 6,089,018 A | | 7/2000 | Bischoff et al. |
| 6,119,654 A | | 9/2000 | Heiselbetz et al. |
| 6,134,888 A | | 10/2000 | Zimmer et al. |
| 6,155,049 A | | 12/2000 | Bischoff |
| 6,186,116 B1 | * | 2/2001 | Armstrong et al. .......... 123/350 |
| 2003/0083798 A1 | * | 5/2003 | Yip et al. .................... 123/350 |

FOREIGN PATENT DOCUMENTS

| EP | 0476811 A2 | 3/1992 |
| EP | 0685638 A2 | 12/1995 |
| GB | 2194985 A | 3/1988 |
| WO | WO 93/05289 | 3/1993 |

\* cited by examiner

Primary Examiner—Tony M. Argenbright
Assistant Examiner—Arnold Castro
(74) Attorney, Agent, or Firm—Edwin W. Bacon, Jr.

(57) ABSTRACT

A method for characterizing an air flow target within an internal combustion engine. The method includes determining an air mass flow rate target, determining an engine speed term, and processing these terms to obtain an air flow target. The air flow target can be used as an input for vehicle controllers including those for controlling pressurized induction systems.

2 Claims, 2 Drawing Sheets

AIR FLOW TARGET DETERMINATION

CROSS-REFERENCE TO RELATED APPLICATIONS

Other features of the present invention are discussed and claimed in commonly assigned and co-pending U.S. application Ser. No. 10/003,990, filed on Oct. 31, 2001 entitled "Air Mass Flow Rate Determination".

FIELD OF THE INVENTION

The present invention relates generally to engine control systems for internal combustion engines, and more particularly, to a method and apparatus for determining an air mass flow rate target used to provide torque control to internal combustion engines having a pressurized induction system.

BACKGROUND OF THE INVENTION

In general, internal combustion engines have at least one inlet manifold for supplying air or a combustible mixture of air and fuel to the engine combustion spaces. To increase the charge of combustible mixture that is supplied to the combustion spaces of the engine, it is common to employ pressurized induction systems, such as blowers and turbochargers, which increase the amount of air delivered to the combustion spaces of the engine. Since fuel is metered to the engine as a function of the mass of air delivered to the combustion spaces, the amount of fuel delivered to the combustion spaces is also increased so as to maintain proper air/fuel ratio. As such, various performance aspects of the engine, such as power output and/or efficiency, can be improved over normally aspirated induction systems.

Turbochargers are a well known type of pressurized induction system. Turbochargers include a turbine, which is driven by exhaust gas from the engine, and a compressor, which is mechanically connected to and driven by the compressor. Rotation of the compressor typically compresses intake air which is thereafter delivered to the intake manifold. The pressure differential between the compressed air and the intake manifold air is known as turbo boost pressure.

At various times during the operation of the engine, it is highly desirable to increase, decrease or eliminate turbo boost pressure to control engine torque to suit the given operating condition. This is typically implemented by controlling the amount of exhaust gas provided to the turbocharger. One common method for controlling the amount of exhaust gas delivered to the turbocharger is a wastegate valve, which is employed to bypass a desired portion of the exhaust gas around the turbine. Most automotive turbochargers use a wastegate valve to control the amount of exhaust gas supplied to the turbine blades. By controlling the amount of exhaust gas that is bypassed around the turbine, the intake air flow is controlled, thereby controlling the turbo boost pressure, the pressure in the intake manifold, and the engine torque. Therefore, it is important to determine how much exhaust gas must be bypassed for a given operating condition. If too much exhaust gas is bypassed, not enough torque will be produced. Conversely, if not enough exhaust gas is bypassed, engine and/or driveline damage may occur due to excessive torque loading.

Methods for controlling the wastegate are well known in the industry. Conventional systems attempt to control the boost pressure by "bleeding off" gas as boost pressure becomes too high. However, these conventional pressure-based systems are reactionary and have several drawbacks. In particular, control systems now often employ model based fueling methods which are based on air flow characteristics. Because most other current fueling models target air flow to determine fuel delivery characteristics, it has also become desirable to target air flow to provide torque control for engines with pressurized induction systems (such as turbochargers, superchargers, etc.).

In order to determine such an air flow target, certain data, such as the amount of air flowing through the throttle body for any operating condition, must be acquired. A method and system for providing this data are described in commonly assigned co-pending U.S. patent application Ser. No. 10/003,990 entitled "Air Mass Flow Rate Determination", which is incorporated by reference as if fully set forth herein. Briefly, the method and system provide the determination of an air mass flow rate target for pressurized induction systems. The air mass flow rate target is indicative of the mass flow rate of compressed air exiting the compressor of the turbocharger assembly. The air mass flow rate target can be determined based on obtaining two components, namely, a reference air mass flow rate term and a compressibility term. The reference air mass flow rate term is obtained through a series of operations which include the determination of a throttle valve position and an air bypass valve position.

Specifically, a throttle position is determined from a signal sent from a throttle position sensor. A throttle position sonic air flow term is bench mapped in a look up table based on throttle position and sonic air flow.

The air bypass valve position is determined from its controlling current sent from an air bypass valve position sensor. An air bypass valve sonic airflow term is bench mapped in a look up table based on the air bypass position and sonic air flow.

The throttle sonic air flow term and the air bypass valve sonic air flow term are then summed to obtain a total throttle and air bypass sonic air flow term, herein referred to as the reference air mass flow rate term.

The compressibility term is determined through a series of operations, including the sensing of engine rotational speed via a sensor. Once the engine rotational speed is determined, the reference air mass flow rate term and the engine rotational speed are input into a surface look up table to obtain a predicted pressure ratio. The predicted pressure ratio is representative of the ratio of pressure at the intake manifold, or manifold absolute pressure (MAP), compared to the pressure before the throttle body, or throttle inlet pressure. A processor performs a mathematical manipulation to derive the compressibility term based in part on the predicted pressure ratio.

The compressibility term is input into a processor along with the reference air mass flow rate term 62. The processor then performs a mathematical manipulation to derive the air mass flow rate target.

It is desirable to utilize the air mass flow rate target data to determine an air flow target to thereby control engine torque for any operating condition and maintain the torque at certain levels in all operating conditions.

SUMMARY OF THE INVENTION

In one embodiment, the present invention provides a method for characterizing an air flow target within an internal combustion engine. The method includes determining an engine rotational speed, an air bypass valve position and a throttle position. The engine rotational speed, air bypass valve position and throttle valve position are processed to obtain an air mass flow rate target. The engine rotational speed and air mass flow rate target are then processed to determine the air flow target.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
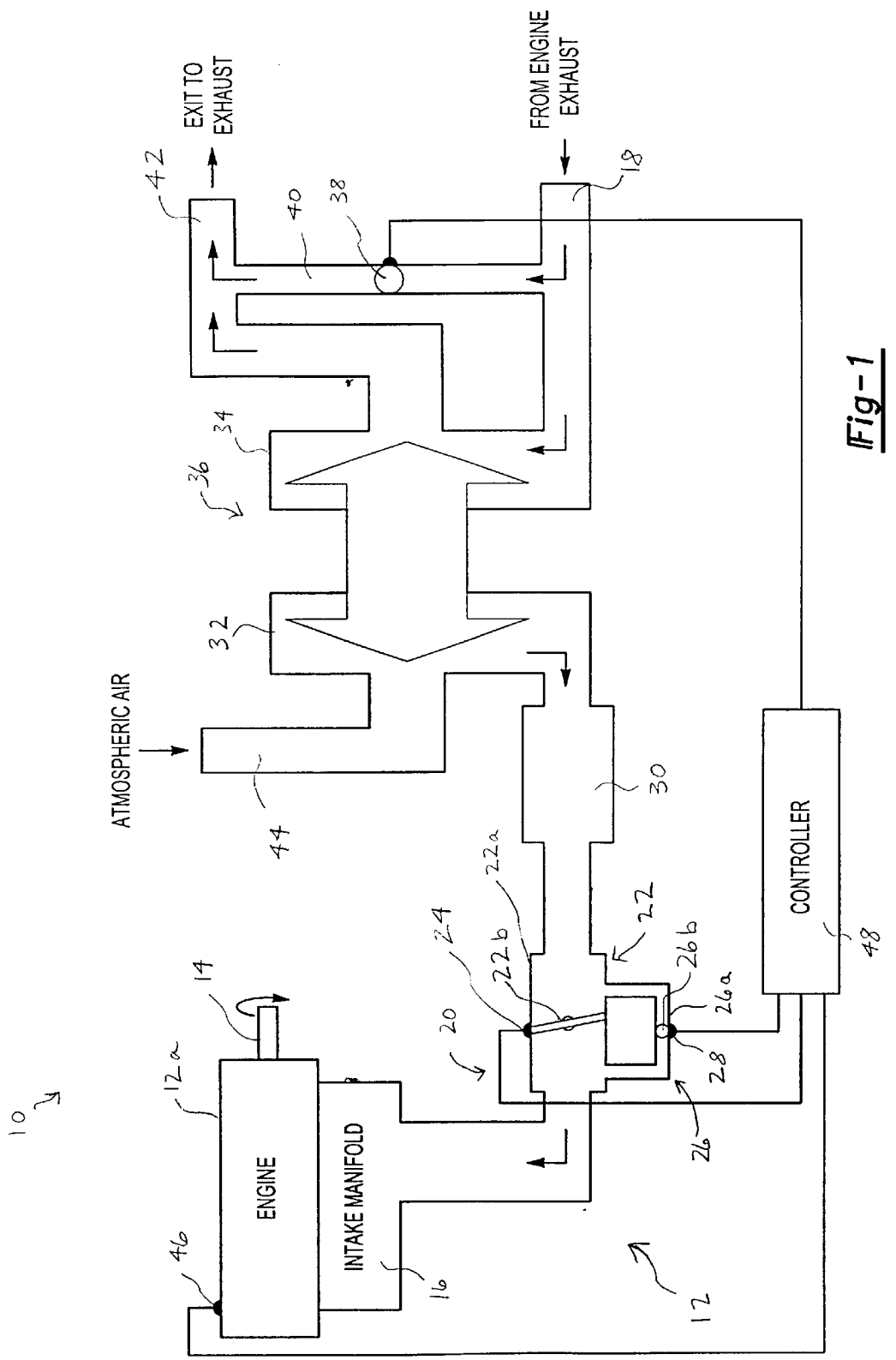
FIG. 1 is a schematic diagram of an exemplary motor vehicle including an engine with a turbocharger system and control unit according to the principles of the present invention.

With initial reference to FIG. 1, a motor vehicle constructed in accordance with the teachings of the present invention is generally identified by reference numeral 10. The motor vehicle 10 includes an engine assembly 12 having an engine 12a with an output shaft 14 for supplying power to driveline components and driven wheels (not shown). The engine assembly 12 includes an intake manifold 16 for channeling air to the engine combustion chambers (not shown) and an exhaust manifold 18 which directs the exhaust gases that are generated during the operation of the engine 12a away from the engine 12a in a desired manner. In addition, the engine assembly 12 includes fuel injection systems or carburetors (not shown).

An induction system 20 is located upstream of the intake manifold 16 and includes a throttle 22 having a throttle housing 22a and a throttle valve 22b which is pivotally mounted within the throttle housing 22a to thereby control the flow of air through the throttle housing 22a. A throttle position sensor 24 supplies a signal indicative of a position of the throttle valve 22b. Induction system 20 also includes an air bypass valve 26 located upstream of the intake manifold 16 and having an air bypass valve housing 26a and an air bypass valve element 26b which is mounted within the air bypass valve housing 26a to thereby control the flow of air through the air bypass valve housing 26a. Preferably, the air bypass valve element 26b is of the disc solenoid type. It will be appreciated that other air bypass valve elements may be used, such as a solenoid plunger type. An air bypass position sensor 28 is used to take the controlling current of the air bypass valve element 26b which is indicative of a position of the air bypass valve element 26b.

The system 20 is equipped with an intercooler 30 provided in the form of, for example, a heat exchanger which reduces the temperature of compressed air in order to increase its density. The intercooler includes an inlet connected to a compressor 32 whose impellers are mechanically connected to the blades (not shown) of turbine 34. The compressor 32 and turbines 34 comprise turbocharger 36.

The blades (not shown) of the turbine 34 are driven by exhaust gas from the exhaust manifold 18. A wastegate 38 or exhaust bypass valve controls the flow of exhaust gas through bypass channels 40, which bypass the turbine 38, to control the speed of the turbine 34 and therefore the boosted pressure provided by the compressor 32. The exhaust gas from the turbine 34 and/or via the wastegate 38 and bypass channels 40 flow away through an exhaust channel 42. The compressor 34 may be connected to chamber 44 which contains an inlet for receiving air from the atmosphere.

A controller 48 is electronically coupled to the throttle position sensor 24, the air bypass position sensor 28, and an engine speed sensor 46, which generates a signal indicative of the rotational speed of the output shaft 14. One skilled in the art will appreciate that the sensor 46 may include a variety of devices capable of determining engine rotational speed. Specifically, an encoder (not shown) outputs electrical pulses every certain number of degrees of rotation of the output shaft 14. The encoder may be used in combination with a timer (not shown) to determine engine rotational speed. One skilled will further appreciate that other methods and mechanisms for determining the engine rotational speed may be implemented without departing from the scope of the present invention. The controller 48 is responsible for controlling the induction in response to the various sensor inputs and a control methodology.

As noted above, it is highly desirable that the magnitude of the engine torque be accurately controlled. One critical step, therefore, is to accurately calculate the air flow target of the engine assembly 12.

Figure 2:
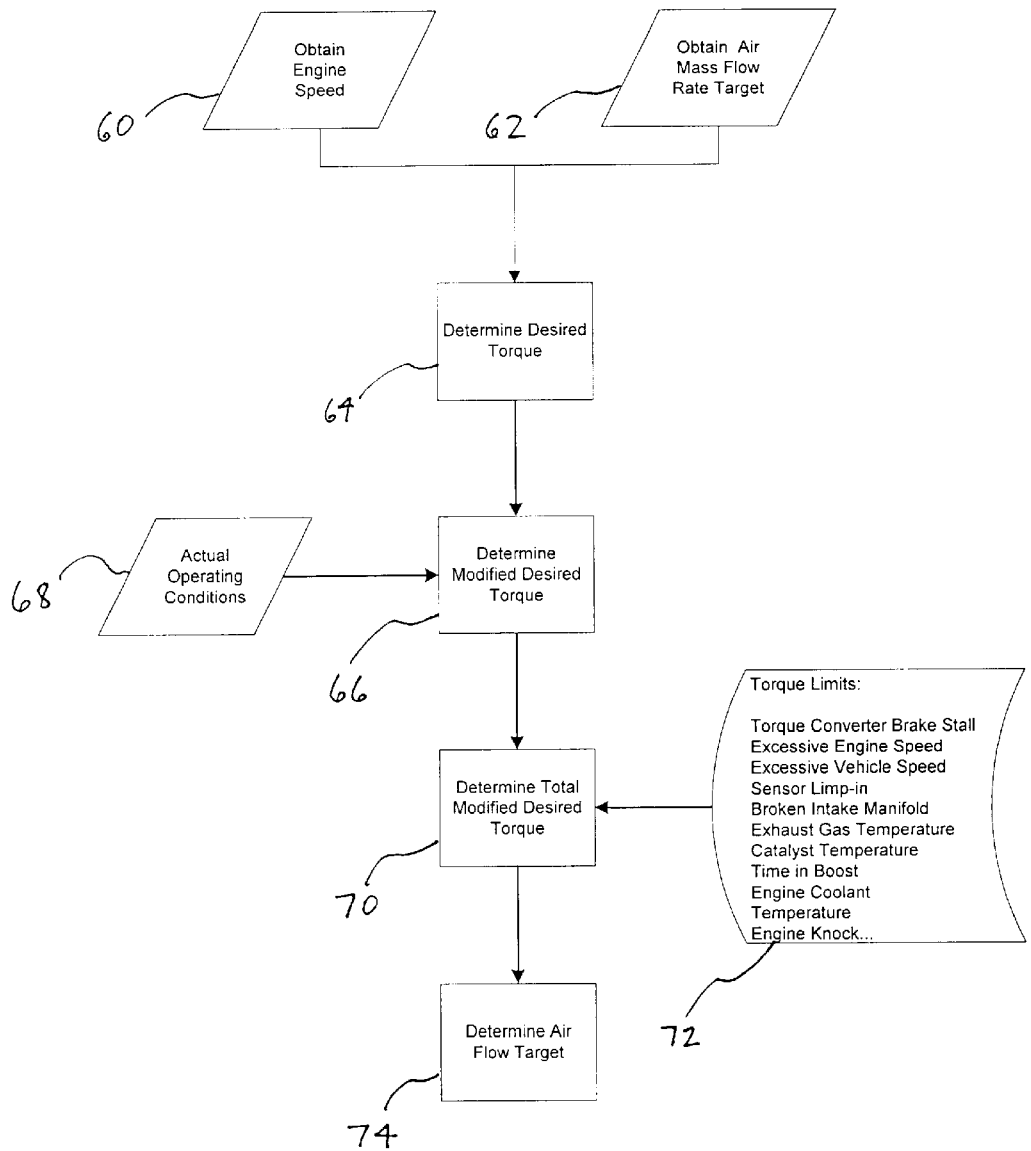
FIG. 2 is a flow diagram showing the methodology of the torque control system of the present invention.

With reference to FIG. 2, the methodology of the present invention is shown. One of ordinary skill in the art will appreciate that the operations of the present invention are controlled by the controller 48.

The method of determining the air flow target begins by obtaining engine rotational speed data and air mass flow rate target data, identified by data block numbers 60 and 62, respectively. The engine speed data 60 is determined by sensing engine rotational speed via sensor 46 (FIG. 1). In the preferred embodiment, the air mass flow rate target data 62 is determined through a series of operations which are described in co-pending U.S. patent application Ser. No. 10/003,990 which has been incorporated by reference herein and previously described, and, therefore, will not be described in further detail. Briefly, the air mass flow rate target is indicative of the mass air flow rate of compressed air exiting the compressor of the pressurized induction system. However, it will be understood that the air mass flow rate target may be obtained from a variety of other sources, such as sensors and/or other computations.

After obtaining the data inputs 60 and 62, the methodology advances to process block 64. In process block 64, the methodology determines a desired torque value. Preferably, a surface look-up table receives the engine speed data and the air mass flow rate target data and maps these values to obtain the desired torque value. The desired torque is preferably mapped at various conditions for the given engine speed and air mass flow rate data, such as, but not limited to, Lean Best Torque (LBT), Maximum Brake Torque (MBT) and at Standard Temperature and Pressure (STP). One of ordinary skill will recognize that if the exact values of the engine speed data and the air mass flow rate target data are not found in the surface look up table, a linear interpolation may be performed to calculate the desired torque value. One skilled will also recognize that a mathematical manipulation may be performed to calculate the desired torque value instead of the above-described surface look-up table procedure.

From process block 64, the methodology advances to process block 66. In process block 66, the desired torque is corrected for the actual operating conditions (data input block 68) of the engine assembly 12 to thereby define a modified desired torque. The actual operating conditions preferably include, but are not limited to, values indicative of fuel/air mixtures from LBT and/or reduced spark (spark advance) from MBT. One of ordinary skill in the art will recognize that these values may be derived from a variety of sources as part of known control methodologies. Preferably, a multiplier is used to process the values indicative of the actual operating conditions and the desired torque to obtain the modified desired torque.

From process block 66, the methodology advances to process block 70 where the modified desired torque value is processed by applying torque limits (block 72) to determine a total modified desired torque. The application of such limits serve to protect the engine and/or driveline from excessive torque loading. As shown, the limits preferably include, but are not limited to, data for torque converter brake stall, excessive engine speed, excessive vehicle speed, sensor limp-in, broken intake manifold, exhaust gas temperature, catalyst temperature, time in boost, engine coolant temperature and engine knock.

The methodology then advances to calculation block 74. In block 74, a series of calculations are performed to obtain the air flow target for the given data. A mathematical manipulation to derive the air flow target is preferably performed using the following equation:

$$\dot{m} = \frac{T \times N}{120 \times k}$$

where:
m=air flow rate target
T=total modified desired torque
N=engine speed data
k=factor as a function of engine speed.

It should be noted that k is preferably stored in a look-up table and is obtained based on the engine speed data. The range of k factors is previously determined based on empirical data and is particular for engine type. The empirical data can be derived from, for example, engine testing on a dynamometer.

The obtained air flow target is an input for other programs within the engine controller 48 and other vehicle component controllers, such as a module for controlling pressurized induction systems like a turbocharger or supercharger. The method of the present invention provides a very accurate estimate of air flow which should be input into the intake manifold for the given operating conditions. As such, the torque can be controlled using air flow data.

It should be noted that the methodology of the present invention has been shown and described in connection with an engine assembly connected to a pressurized induction system of the turbocharger type for exemplary purposes only. One of ordinary skill in the art will appreciate that other types of pressurized induction systems, such as the supercharger type, may alternatively be used without departing from the scope of the invention.

It is intended that the invention not be limited to the particular embodiment illustrated by the drawings and described in this specification as the best mode presently contemplated for carrying out this invention, but that the invention will include any embodiment falling within the description of the appended claims.

What is claimed is:

1. A method of characterizing an air flow target in an internal combustion engine, comprising:

determining an engine rotational speed;

determining an air bypass valve position;

determining a throttle position;

manipulating said engine rotational speed, said air bypass valve position and said throttle position to obtain a reference air mass flow rate term and an adjusted compressibility term which are multiplied to obtain an air mass flow rate target; and determining the air flow target based on said engine rotational speed and said air mass flow rate target.

2. A method for controlling the air flow into an engine having an intake manifold, a throttle, an air bypass valve, a pressurized induction system and a wastegate, said method comprising:

determining a throttle position;

determining a throttle position sonic air flow term based on said throttle position;

determining an air bypass valve position;

determining an air bypass valve sonic air flow term based on said air bypass valve position;

determining a reference air mass flow rate term based on said throttle position sonic air flow term and said air bypass valve sonic air flow term;

determining an engine rotational speed;

determining a predicted pressure ratio of an intake manifold pressure to a throttle inlet pressure based on said engine rotational speed and said reference air mass flow rate term;

determining a compressibility term based on said predicted pressure ratio;

determining an air mass flow rate target based on said reference air mass flow rate term and said compressibility term;

determining a desired torque term based on said engine rotational speed and said air mass flow rate target;

correcting said desired torque for at least one actual operating condition to obtain a modified desired torque term;

applying at least one limiting parameter to said modified desired torque term to obtain a total modified desired torque term; and determining an air flow target based on said total modified desired torque term.

* * * * *